United States Patent
Ellison et al.

(10) Patent No.: US 10,710,920 B2
(45) Date of Patent: Jul. 14, 2020

(54) METHODS FOR THERMALLY TREATING GLASS ARTICLES

(71) Applicant: CORNING INCORPORATED, Corning, NY (US)

(72) Inventors: Adam James Ellison, Corning, NY (US); Timothy James Kiczenski, Corning, NY (US); Stephanie Lynn Morris, Wilmington, NC (US); Robert Anthony Schaut, Painted Post, NY (US); Steven Alvin Tietje, Lindley, NY (US)

(73) Assignee: CORNING INCORPORATED, Corning, NY (US)

( * ) Notice: Subject to any disclaimer, the term of this patent is extended or adjusted under 35 U.S.C. 154(b) by 341 days.

(21) Appl. No.: 15/541,240

(22) PCT Filed: Dec. 30, 2015

(86) PCT No.: PCT/US2015/068108
§ 371 (c)(1),
(2) Date: Jun. 30, 2017

(87) PCT Pub. No.: WO2016/109697
PCT Pub. Date: Jul. 7, 2016

(65) Prior Publication Data
US 2018/0002216 A1    Jan. 4, 2018

Related U.S. Application Data

(60) Provisional application No. 62/098,711, filed on Dec. 31, 2014.

(51) Int. Cl.
*C03B 32/00* (2006.01)
*C03C 21/00* (2006.01)
(Continued)

(52) U.S. Cl.
CPC .............. *C03B 32/00* (2013.01); *C03B 25/00* (2013.01); *C03B 25/08* (2013.01); *C03B 25/093* (2013.01);
(Continued)

(58) Field of Classification Search
None
See application file for complete search history.

(56) References Cited

U.S. PATENT DOCUMENTS 1,540,264 A * 6/1925 Henry ..................... C03B 25/02
65/117
1,585,542 A * 5/1926 Henry ..................... C03B 25/02
264/346

(Continued)

FOREIGN PATENT DOCUMENTS

CA    2877742 A1    1/2014
CA    2888831 A1    6/2014
(Continued)

OTHER PUBLICATIONS

"Densities of Miscellaneous Solids". The Engineering ToolBox, Dec. 15, 2014 [online] [retrieved Jul. 17, 2019]. Retrieved from: <URL: https://web.archive.org/web/20141215051319/www.engineeringtoolbox.com/density-solids-d_1265.htnnl>. (Year: 2014).*

(Continued)

*Primary Examiner* — Erin Snelting
(74) *Attorney, Agent, or Firm* — Dinsmore & Shohl LLP

(57) ABSTRACT

According to one embodiment, a method for thermally treating glass articles may include holding a glass article at a treatment temperature equal to an annealing temperature of the glass article ±15° C. for a holding time greater than or equal to 5 minutes. Thereafter, the glass article may be cooled from the treatment temperature through a strain point of the glass article at a first cooling rate CR1 less than 0°

(Continued)

C./min and greater than −20° C./min such that a density of the glass article is greater than or equal to 0.003 g/cc after cooling. The glass article is subsequently cooled from below the strain point at a second cooling rate $CR_2$, wherein $|CR_2|>|CR_1|$.

18 Claims, 10 Drawing Sheets

(51) Int. Cl.
    *C03B 25/00*     (2006.01)
    *C03C 3/087*     (2006.01)
    *C03C 23/00*     (2006.01)
    *C03B 25/08*     (2006.01)
    *C03B 25/093*    (2006.01)
    *C03B 27/03*     (2006.01)

(52) U.S. Cl.
    CPC .............. *C03B 27/03* (2013.01); *C03C 3/087* (2013.01); *C03C 21/002* (2013.01); *C03C 23/007* (2013.01); *Y02P 40/57* (2015.11)

(56) References Cited

U.S. PATENT DOCUMENTS

| | | | |
|---|---|---|---|
| 1,974,058 A * | 9/1934 | Wadman | C03B 25/06 |
| | | | 65/119 |
| 3,348,934 A | 10/1967 | Hinson et al. | |
| 3,524,737 A | 8/1970 | Doyle et al. | |
| 4,481,025 A * | 11/1984 | Rodriguez | C03B 25/06 |
| | | | 65/119 |
| 6,114,039 A | 9/2000 | Rifqi | |
| 6,595,029 B1 | 7/2003 | Dick et al. | |
| 6,810,688 B1 | 11/2004 | Duisit et al. | |
| 8,232,218 B2 | 7/2012 | Dejneka et al. | |
| 8,596,094 B2 | 12/2013 | Duran et al. | |
| 9,796,615 B2 | 10/2017 | Moseler et al. | |
| 2004/0129026 A1 | 7/2004 | Bartsch | |
| 2004/0221615 A1 | 11/2004 | Postupack et al. | |
| 2006/0293162 A1* | 12/2006 | Ellison | C03B 17/06 |
| | | | 501/66 |
| 2007/0141349 A1 | 6/2007 | Hessenkemper et al. | |
| 2008/0206494 A1 | 8/2008 | Kurachi et al. | |
| 2009/0220761 A1* | 9/2009 | Dejneka | C03B 17/067 |
| | | | 428/220 |
| 2009/0286091 A1 | 11/2009 | Danielson et al. | |
| 2010/0162759 A1 | 7/2010 | Duran et al. | |
| 2010/0255229 A1 | 10/2010 | Wada | |
| 2010/0300535 A1* | 12/2010 | Aitken | C03C 3/087 |
| | | | 136/260 |
| 2010/0300536 A1* | 12/2010 | Aitken | C03C 3/064 |
| | | | 136/260 |
| 2011/0003483 A1 | 1/2011 | Nishizawa et al. | |
| 2011/0159219 A1 | 6/2011 | Yue et al. | |
| 2011/0265516 A1 | 11/2011 | Allan et al. | |
| 2012/0085130 A1* | 4/2012 | Hill | C03B 25/08 |
| | | | 65/30.14 |
| 2013/0101596 A1* | 4/2013 | DeMartino | A61J 1/00 |
| | | | 424/142.1 |
| 2013/0101764 A1* | 4/2013 | Schaut | C03C 3/087 |
| | | | 428/34.4 |
| 2013/0225390 A1* | 8/2013 | Ellison | C03C 3/093 |
| | | | 501/66 |
| 2013/0260154 A1 | 10/2013 | Allan et al. | |
| 2013/0327740 A1 | 12/2013 | Adib et al. | |
| 2014/0087193 A1 | 3/2014 | Cites et al. | |
| 2014/0150499 A1 | 6/2014 | Danielson et al. | |
| 2014/0151371 A1 | 6/2014 | Chang et al. | |
| 2016/0016841 A1 | 1/2016 | Frost et al. | |

FOREIGN PATENT DOCUMENTS

| | | |
|---|---|---|
| CN | 103204622 A | 7/2013 |
| CN | 105008297 A | 10/2015 |
| DE | 19812056 C1 | 10/1999 |
| DE | 102007028543 A1 | 3/2008 |
| EP | 2977358 A1 | 1/2016 |
| EP | 1874699 B1 | 12/2018 |
| ES | 2026422 A6 | 4/1992 |
| GB | 966735 A | 8/1964 |
| GB | 1509644 A | 5/1978 |
| JP | H01201048 A | 8/1989 |
| JP | 2003040634 A | 2/2003 |
| JP | 2010243091 A | 10/2010 |
| JP | 2013173668 A | 9/2013 |
| RU | 2151108 C1 | 6/2000 |
| RU | 2324665 C2 | 5/2008 |
| RU | 2496725 C1 | 10/2013 |
| SU | 1551665 A1 | 3/1990 |
| TW | 201141802 A1 | 12/2011 |
| WO | WO01/038249 A1 | 5/2001 |
| WO | 2004094329 A1 | 11/2004 |
| WO | 2012041473 A1 | 4/2012 |
| WO | 2012048293 A2 | 4/2012 |
| WO | 2013145503 A1 | 10/2013 |
| WO | 2013185018 A1 | 12/2013 |
| WO | 2014005030 A1 | 1/2014 |

OTHER PUBLICATIONS

International Search Report & Written Opinion dated Mar. 11, 2016 for International Patent Application No. PCT/US2015/068104 filed Dec. 30, 2015. pp. 1-13.

International Search Report & Written Opinion dated Mar. 15, 2016 for International Patent Application No. PCT/US2015/068108 filed Dec. 30, 2015. pp. 1-13.

Mallick et al., "Strengthening of container glasses by ion-exchange dip coating"; Journal of Non-Crystalline Solids 351 (2005) 2524-2536; pp. 2524-2536.

Jiang, et al., "Stress Relaxation of Ion Exchanged Float Aluminosilicate Glass at Different Temperature", Advanced Materials Research, vol. 650, pp. 216-219 (2013).

English Translation of Taiwan Search Report dated Feb. 19, 2019 for TW Patent Application No. 104144738 filed Dec. 31, 2015. p. 1.

English Translation of Russian 1st Office Action & Search Report dated May 7, 2019, for RU Patent Application No. 1 2017125444. pp. 1-13.

English Translation of Russian 1st Office Action & Search Report dated Jun. 28, 2019, for RU Patent Application No. 2017125443. pp. 1-13.

Chinese 1st Office Action & Search Report dated Jul. 24, 2019, for CN 201580071668.8. pp. 1-12.

Chinese 1st Office Action & Search Report dated Jul. 26, 2019, for CN 201580071679.6. pp. 1-12.

Canadian 1st Office Action dated Sep. 26, 2019, for CA Patent Application No. 2,972,777. pp. 1-3.

Indian 1st Examination Report dated Oct. 4, 2019, for in Patent Application No. 201717022433. pp. 1-5.

Non-Final Office Action dated Oct. 2, 2019, for U.S. Appl. No. 15/541,238, filed Jun. 30, 2017. pp. 1-14.

Korean 1st Office Action dated Jan. 10, 2020, for KR Patent Application No. 2017-7021362. pp. 1-6.

Japanese 1st Office Action dated Nov. 27, 2019, for JP Patent Application No. 2017-534228. pp. 1-9.

Japanese 1st Office Action dated Dec. 4, 2019, for JP Patent Application No. 2017-534227. pp. 1-10.

Notice of Allowance dated Jan. 17, 2020, for U.S. Appl. No. 15/541,238, filed Jun. 30, 2017. pp. 1-10.

* cited by examiner

US 10,710,920 B2

METHODS FOR THERMALLY TREATING GLASS ARTICLES

CROSS REFERENCE TO RELATED APPLICATIONS

The present specification claim priority to U.S. Provisional Patent Application Ser. No. 62/098,711 filed Dec. 31, 2014 and entitled "Methods for Thermally Treating Glass Articles," the entirety of which is incorporated by referenced herein.

BACKGROUND

Field

The present specification generally relates to methods for treating glass articles and, more specifically, to methods for treating glass articles to improve one or more properties of the glass articles.

Technical Background

Glass is commonly employed in a variety of commercial and consumer applications due to its unique properties relative to other types of materials. For example, the relative inertness of glass, at least compared to polymeric materials, makes glass well suited for use in packaging consumables, such as food stuffs or pharmaceuticals, which can interact with the packaging materials. Likewise, the relative hardness or scratch resistance of glass, at least compared to polymeric materials, makes glass well suited for use as cover glasses in electronic devices such as LCD and LED displays, computer monitors, automated teller machines (ATMs) and the like.

Glass articles used in the aforementioned consumer and commercial applications must be sufficiently robust to endure regular contact without damage or failure. Strengthening processes, such as ion exchange processes, may be used to strengthen glass articles, making them more resistant to failure from routine contact. However, such processes can be expensive, adding to the ultimate cost of the glass article as well as the product incorporating the glass article.

Accordingly, a need exists for alternative methods for enhancing the properties of glass.

SUMMARY

According to one embodiment, a method for thermally treating glass articles may include holding a glass article at a treatment temperature equal to an annealing temperature of the glass article ±15° C. for a holding time greater than or equal to 5 minutes. Thereafter, the glass article may be cooled from the treatment temperature through a strain point of the glass article at a first cooling rate $CR_1$ less than 0° C./min and greater than −20° C./min such that a density of the glass article is greater than or equal to 0.003 g/cc after cooling. The glass article is subsequently cooled from below the strain point at a second cooling rate $CR_2$, wherein $|CR_2|>|CR_1|$.

In another embodiment, a method for thermally treating glass articles may include holding a glass article at a treatment temperature equal to an annealing temperature of the glass article ±15° C. for a holding time greater than or equal to 5 minutes and less than or equal to 15 minutes. The glass article may have a pre-treatment exchange parameter $K_{50}$ prior to thermally treating the glass article. Thereafter, the glass article may be cooled from the treatment temperature through a strain point of the glass article at a first cooling rate $CR_1$ less than 0° C./min and greater than −20° C./min. The glass article may then be cooled from below the strain point at a second cooling rate $CR_2$, wherein $|CR_2|>|CR_1|$. After the thermal treatment the glass article may have a post-treatment exchange parameter $K^*_{50}$, wherein $K_{50}$ is greater than $K^*_{50}$.

Additional features and advantages of the methods for thermally treating glass articles described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
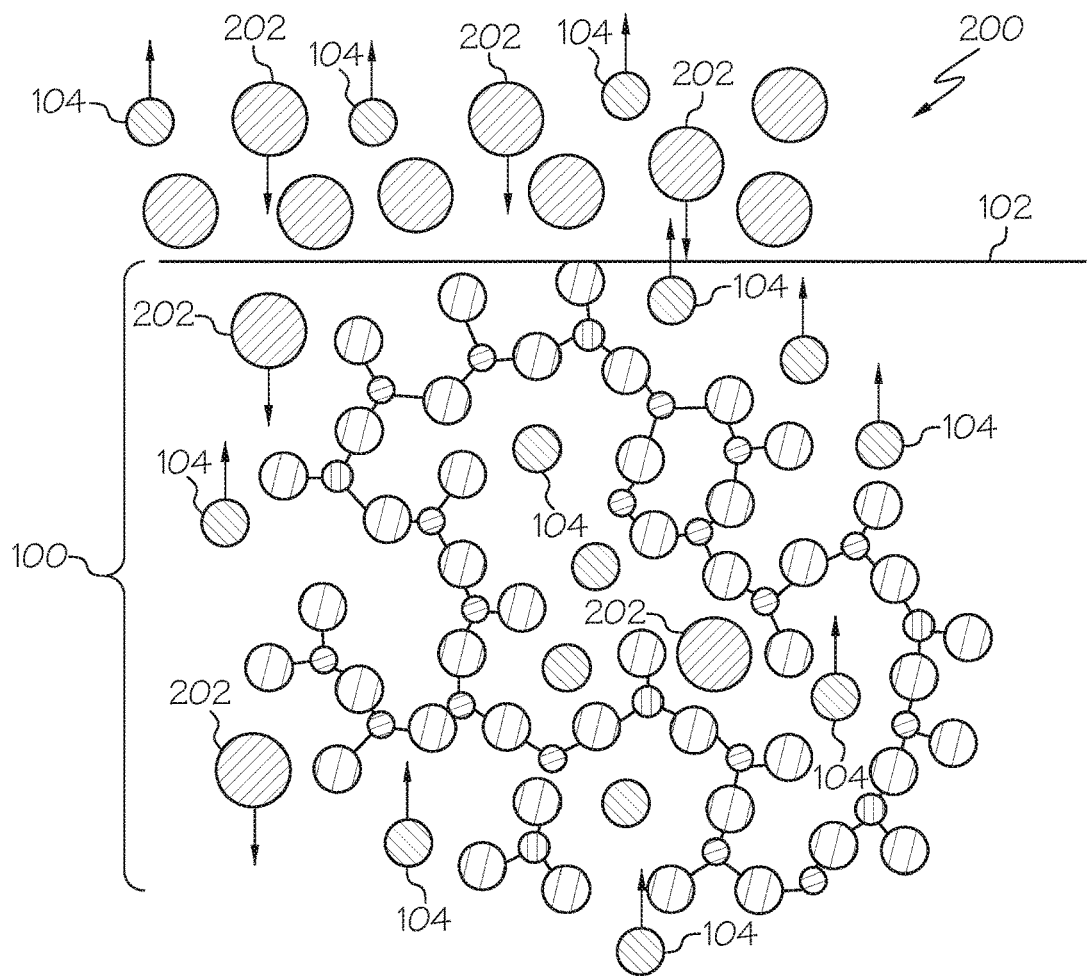
FIG. 1A schematically depicts the glass network of a glass article positioned in an ion exchange bath of 100% $KNO_3$.

Reference will now be made in detail to embodiments of the methods for thermally treating glass articles described herein, examples of which are illustrated in the accompanying drawings. Whenever possible, the same reference numerals will be used throughout the drawings to refer to the same or like parts. According to one embodiment, a method for thermally treating glass articles may include holding a glass article at a treatment temperature equal to an annealing temperature of the glass article ±15° C. for a holding time greater than or equal to 5 minutes. Thereafter, the glass article may be cooled from the treatment temperature through a strain point of the glass article at a first cooling rate $CR_1$ less than 0° C./min and greater than −20° C./min such that a density of the glass article is greater than or equal to 0.003 g/cc after cooling. The glass article is subsequently cooled from below the strain point at a second cooling rate $CR_2$, wherein $|CR_2|>|CR_1|$. Various embodiments of the methods for thermally treating glass articles and glass articles treated thereby will be described in further detail herein with specific reference to the appended drawings.

The phrase "strain temperature" or "strain point," as used herein, refers to the temperature at which a glass has a viscosity of $1\times10^{14.5}$ poise.

The phrase "anneal temperature" or "annealing temperature," as used herein, refers to the temperature at which a glass has a viscosity of $1\times10^{13.0}$ poise.

The phrase "softening point," as used herein, refers to the temperature at which a glass has a viscosity of $1\times10^{7.6}$ poise.

The phrase "glass transition temperature," as used herein, refers to the temperature at which a glass has a viscosity from about log 13 to about log 13.5 poise.

The phrase "fictive temperature," as used herein, refers to the temperature at which the structure of the supercooled liquid is "frozen" into the glass. The "fictive temperature" may also be defined as the intersection of the extrapolated liquid and glass state lines, at which point the glass structure is in equilibrium.

The term "chemical durability," as used herein, refers to the ability of a glass composition to resist degradation upon exposure to specified chemical conditions. The chemical durability of a glass composition can be assessed according to various established material testing standards: DIN 12116 dated March 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; ISO 720:1985 entitled "Glass—Hydrolytic resistance of glass grains at 121 degrees C.—Method of test and classification"; and ISO 719:1985 "Glass—Hydrolytic resistance of glass grains at 98 degrees C.—Method of test and classification." The chemical durability of a glass may also be assessed according to USP <660> entitled "Surface Glass Test," and/or European Pharmacopeia 3.2.1 entitled "Glass Containers For Pharmaceutical Use" each of which can be used to assess the chemical durability of the surface of the glass, specifically the surface hydrolytic resistance (SHR) of the surfaces of the glass.

The phrase "hydrolytic titration value," as used herein, refers to the volume (mL) of 0.1M hydrochloric acid per 100 mL of test liquid required to titrate the test liquid to a colorimetric endpoint for methyl red indicator. The hydrolytic titration value is determined according to the "Surface Glass Test" described in USP <660> "Containers—Glass." For purposes of this description, the hydrolytic titration value may be expressed as a pre-treatment hydrolytic titration value or a post-treatment hydrolytic titration value. The pre-treatment hydrolytic titration value is a characterization of the surface hydrolytic resistance of the surface of the glass article in its as-formed condition (i.e., after formation of the glass article but prior to any modification of the surfaces of the glass article including, without limitation, exposure to the treatment methods described herein and/or the application of any coating materials to the surfaces of the glass article). The post-treatment hydrolytic titration value is a characterization of the surface hydrolytic resistance of the surfaces of the glass article after exposure to the treatment methods described herein but prior to any other modifications to the surfaces of the glass article subsequent to formation, including the application of any coating materials (if any) to the surfaces of the glass article. Higher values of the hydrolytic titration value indicate lower surface hydrolytic resistance while lower values of the hydrolytic titration value indicate greater surface hydrolytic resistance. In the event that the glass article is not a glass container or is otherwise incapable of containing the test liquid, the hydrolytic titration value may be determined according to the "Powdered Glass Test" of USP <660>.

The phrase "exchange parameter," as used herein, refers to the time (in minutes) for a glass article to reach a 50 micron depth of layer during ion exchange in a bath of 100% $KNO_3$ at a specified temperature. For purposes of this description, the exchange parameter may be expressed as a pre-treatment exchange parameter $K_{50}$ or a post-treatment exchange parameter $K^*_{50}$. The pre-treatment exchange parameter $K_{50}$ is a characterization of the time it takes to reach a 50 micron depth of layer during ion exchange in a bath of 100% $KNO_3$ when the glass article is in as-formed condition (i.e., after formation of the glass article but prior to any additional processing or heat treatments including, without limitation heat treatment, annealing, and/or the methods described herein). The post-treatment exchange parameter $K^*_{50}$ is a characterization of the time it takes to reach a 50 micron depth of layer during ion exchange in a bath of 100% $KNO_3$ after exposure of the as-formed glass article to the treatment methods described herein but prior to any other processes or treatments.

The depth of layer (DOL) and surface compressive stress (CS) for a particular ion exchange condition (time and temperature) may be determined with a fundamental stress meter (FSM) instrument, with the compressive stress value based on the measured stress optical coefficient (SOC). In the embodiments described herein, the depth of layer and surface compressive stress were determined with an FSM-6000 LE manufactured by Luceo Co., Ltd. of Japan. The FSM instrument couples light into and out of the birefringent glass surface. The measured birefringence is then related to stress through a material constant, the stress-optic or photoelastic coefficient (SOC or PEC) and two parameters are obtained: the maximum surface compressive stress (CS) and the exchanged depth of layer (DOL).

When exchange parameters are compared herein, such as a comparison between the post-treatment exchange parameter $K^*_{50}$ and the pre-treatment exchange parameter $K_{50}$, the comparison is for the same ion exchange temperature, unless otherwise specified. Lower values of the exchange parameter generally indicate greater speeds for the ion-exchange process leading to less time and lower costs for obtaining equivalent glass properties for a given ion exchange temperature. Lower values of the exchange parameter generally correlate with reduced glass density.

The phrase "as-formed condition," as used herein, refers to the glass article after the glass article has been formed, either from glass stock or a melt, but prior to exposing the glass article to any additional treatment or processing steps, such as heat treatment, ion exchange strengthening, coating, acid etching, and/or any surface modifications or the like.

The phrase "glass article," as used herein, refers to any article formed from glass and having any of a variety of regular or irregular geometries and/or form factors including, without limitation, plates, rods, tubes, containers and the like. In embodiments where the glass article is a glass container, the glass container may have any one of a variety of form factors including, without limitation, vials, vacutainers, cartridges, syringes, syringe barrels, ampoules, bottles, flasks, phials, tubes, beakers, or the like.

In conventional glass manufacturing processes, such as tube to vial conversion or the like, glass articles may be cooled relatively rapidly, such as at a cooling rate of −30° C./min to −50° C./min or faster, from above or at the annealing temperature to below the strain point. Cooling may be done at ambient temperatures or by bringing the glass articles into proximity or contact with tooling that has a high thermal conductivity such as, for example, metal or graphite tooling. Differences in the cooling rate between adjacent regions of the glass article may create stresses and stress heterogeneities, necessitating an additional thermal treatment to remove the stress heterogeneities. Following the additional thermal treatment, the glass articles may be rapidly cooled, again at a cooling rate of −30° C./min to −50° C./min or faster. Thereafter, the glass articles may be further processed, such as by ion exchange, to introduce compressive stress in the surface of the glass article thereby improving the mechanical properties of the glass. However, such processes can add both time and expense to the manufacturing process, increasing the overall cost of the glass article.

It has now been determined that the parameters of the thermal treatment can be modified and controlled to alter the properties of the glass and to improve the efficiency and cost effectiveness of downstream processes, such as ion exchange processes, thereby reducing the overall manufacturing costs. It has also been determined that the parameters of the thermal treatment can be modified and controlled to enhance the properties of the glass article, making the glass article more amenable to strengthening by ion exchange and/or improving the surface hydrolytic resistance of the glass article. These thermal treatment methods will be described in further detail herein.

In the embodiments of the thermal treatment methods described herein, the glass articles have a pre-treatment hydrolytic titration value and a pre-treatment exchange parameter prior to thermal treatment. Thermal treatment methods described herein modify the properties of the glass such that the glass articles have a post-treatment hydrolytic titration value that is less than the pre-treatment hydrolytic titration value.

In the embodiments described herein the thermal treatment includes holding the glass article at a treatment temperature within ±15° C. of the annealing temperature of the glass article for a holding time greater than or equal to 5 minutes. In some embodiments, the treatment temperature may be achieved by heating the glass article from an initial temperature lower than the treatment temperature to the treatment temperature at a heating rate $HR_1$. For example, the initial temperature may be room temperature (RT) or an intermediate temperature between room temperature and the treatment temperature. In some other embodiments, the treatment temperature may be achieved by cooling the glass article from an initial temperature greater than the treatment temperature to the treatment temperature. For example, the initial temperature may be the temperature at which the glass article is formed and/or shaped, such as when the thermal treatment is performed as part of a continuous manufacturing process.

The treatment temperature is generally within ±15° C. of the annealing temperature of the glass article. In some embodiments, the treatment temperature is within ±10° C. of the annealing temperature. In some other embodiments, the treatment temperature is within ±5° C. of the annealing temperature. In still other embodiments, the treatment temperature is within a range from the annealing temperature to 10° C. greater than the annealing temperature or even within a range from the annealing temperature to 5° C. greater than the annealing temperature.

The glass articles are held at the treatment temperature for a holding time greater than or equal to 5 minutes. In some embodiments the holding time may be in a range from about 5 minutes to about 15 minutes. In some embodiments, the holding time may be in a range from about 10 minutes to about 15 minutes. Holding the glass articles at the treatment temperature at or near the annealing temperature (and above the glass transition temperature) homogenizes the stress within the glass, effectively eliminating stress gradients between adjacent areas caused by non-uniform cooling following formation and/or shaping of the glass article.

After the holding time has elapsed, the glass articles are cooled from the treatment temperature through the strain point of the glass at a controlled first cooling rate $CR_1$. In the embodiments described herein, the first cooling rate $CR_1$ is less than 0° C./min and greater than about −20° C./min. For example, in some embodiments, the first cooling rate $CR_1$ is from about −1° C./min to about −10° C./min. In some embodiments described herein, the first cooling rate $CR_1$ is substantially constant between the treatment temperature and the strain point. In some other embodiments, the first cooling rate $CR_1$ may be accelerated as the temperature of the glass article approaches the strain point. The relatively slow first cooling rate $CR_1$ (relative to the more rapid cooling rates of conventional processes) decreases the fictive temperature of the glass while increasing the density of the glass, each of which enhance the properties of the finished glass article.

In embodiments, the glass article may be cooled at the first cooling rate $CR_1$ until the temperature of the glass article is at or below the strain point of the glass. In some embodiments, the glass article may be cooled at the first cooling rate $CR_1$ from about 0.3 hours to about 3 hours to decrease the temperature of the glass to or below the strain point of the glass. In some other embodiments, the glass article may be cooled at the first cooling rate $CR_1$ from about 0.5 hours to about 1 hour to decrease the temperature of the glass to or below the strain point of the glass.

In embodiments where the glass articles are heated to the treatment temperature from an initial temperature less than the treatment temperature, the absolute value of the heating rate $HR_1$ from the initial temperature to the treatment temperature may be greater than the absolute value of the first cooling rate $CR_1$ (i.e., $|HR_1|>|CR_1|$). This differential between the first cooling rate $CR_1$ and the heating rate $HR_1$ improves the structural relaxation behavior of the glass, increasing the temperature at which structural relaxation occurs. In contrast, glass articles that are both rapidly heated to the treatment temperature and rapidly cooled from the treatment temperature (i.e., $|HR_1|\sim|CR_1|$) generally exhibit structural relaxation at relatively lower temperatures which may adversely effect other properties of the glass.

After the glass articles have been cooled through the strain point, properties of the glass, such as the fictive temperature and the density, are effectively "frozen" in the glass. This allows the glass to be cooled more rapidly without further alteration of the properties of the glass or the introduction of stress heterogeneities. In some embodiments, after the glass articles have been cooled through the strain point, the glass articles may be further cooled at a second cooling rate $CR_2$, the absolute value of which is greater than the absolute value of the first cooling rate $CR_1$ (i.e., $|CR_2|>|CR_1|$). In some embodiments, the glass article is cooled at the second cooling rate $CR_2$ to room temperature. In embodiments, the second cooling rate CR2 may be up to $-100°$ C./min or faster.

In the embodiments described herein, cooling the glass article from the treatment temperature to the strain point of the glass at the relatively slow cooling rate $CR_1$ provides a thoroughly annealed glass, lowers the fictive temperature of the glass, and increases the density of the glass. In embodiments, the density of the glass may be increased from less than 0.003 g/cc prior to thermal treatment to greater than or equal to 0.003 g/cc after thermal treatment according to the methods described herein.

The thermal treatments described herein improve the ion exchange characteristics of the glass article. In particular, the thermal treatments decrease the time required to reach a specified depth of layer for a given ion exchange temperature. That is, the thermal treatments decrease the post-treatment exchange value $K^*_{50}$ of the glass relative to the pre-treatment exchange value $K_{50}$.

Specifically referring to FIG. 1A, the atomic level network structure of a glass article 100 is schematically depicted positioned in a molten salt bath 200 comprising $K^+$ ions 202 (i.e., a molten salt bath of $KNO_3$). The glass article 100 is formed from an alkali containing glass, such as an alkali aluminosilicate glass or the like, that is amenable to ion exchange. In the embodiment depicted in FIG. 1A, the alkali ions in the glass are $Na^+$ ions 104. The $K^+$ ions 202 from the molten salt bath diffuse into the surface 102 of the glass article 100 and are exchanged for $Na^+$ ions 104 in the glass network. In turn, the $Na^+$ ions 104 diffuse out of the glass network and into the molten salt bath 200. The replacement of the relatively smaller $Na^+$ ions 104 in the glass network with the relatively larger $K^+$ ions 202 from the molten salt bath 200 creates a compressive stress in the surface of the glass article 100. That is, as the $K^+$ and $Na^+$ ions exchange in the glass, the region of the surface 102 which has been exchanged swells (strains) to accommodate the larger $K^+$ ions. The surface 102 is, however, unable to strain significantly and, instead, is held close to its original volume by the non-altered glass bulk. The resistance to strain imposed by the bulk (non-exchanged) glass produces stress in two regions: compression in the region closest to the surface 102 that wants to strain to a larger volume; and tension in the bulk region furthest from the surface 102 which is being pulled to a larger volume by the altered surface. The amount of stress generated therefore depends upon the amount of alkali exchanged (Na—K concentration and depth) as well as the glass thickness, since the stress is a result of force balance between the surface compression and bulk tension. The thermal treatment history of the glass also effects the generation of stress.

Figure 1B:
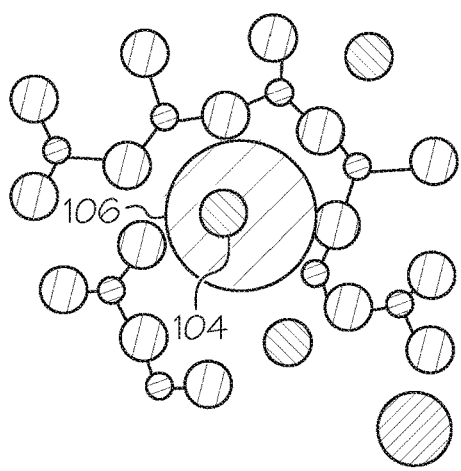
FIG. 1B schematically depicts an alkali site in the glass network of a non-thermally treated glass article.
Figure 1C:
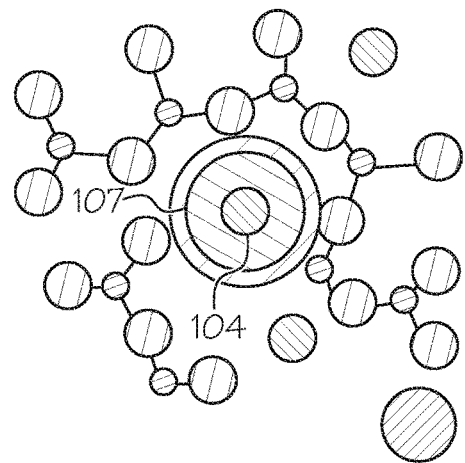
FIG. 1C schematically depicts an alkali site in the glass network of a thermally treated glass article.

Referring to FIGS. 1B and 1C by way of example, FIG. 1B schematically depicts an alkali site 106 occupied by an $Na^+$ ion 104 in the glass network of a non-thermally treated glass article. FIG. 1C schematically depicts an alkali site 107 occupied by an $Na^+$ ion 104 in the glass network of a glass article thermally treated according to the thermal treatment methods described herein. The relative size difference between the alkali site 106 (FIG. 1B) of the non-thermally treated glass article and the alkali site 107 (FIG. 1C) of the thermally treated glass article is due to the greater density imparted to the glass article by the thermal treatments described herein. The alkali site 107 of the thermally treated glass article is smaller and, as such, the replacement of the smaller $Na^+$ ion 104 in the alkali site 107 with a larger $K^+$ ion during ion exchange creates more strain in the glass network, generating more compressive stress per exchanged ion. This indicates that the thermal treatments described herein generally improve the stress generating efficiency of the glass during ion exchange.

Figure 2:
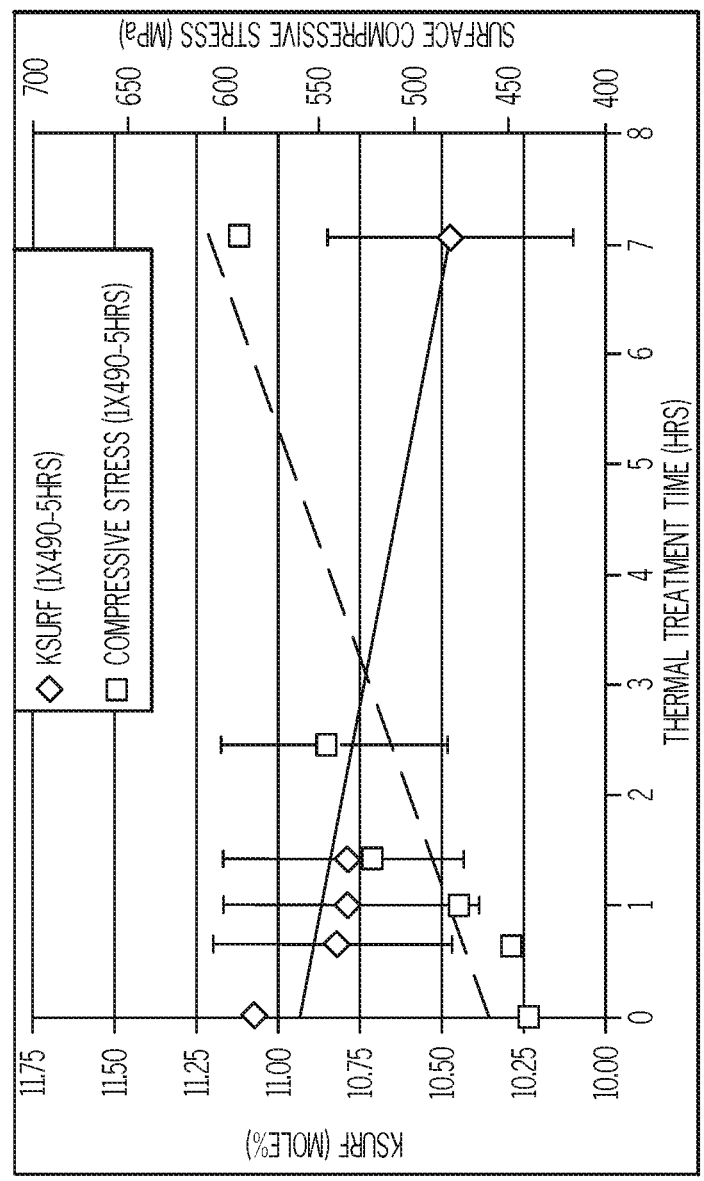
FIG. 2 graphically depicts the potassium concentration at the surface of a glass article and the compressive stress at the surface of a glass article as a function of thermal treatment time.

In addition, it has also been determined that the time of the thermal treatment also effects the generation of compressive stress in the surface of the glass article. For example, FIG. 2 graphically depicts the surface concentration of potassium (left-hand y-ordinate) and the surface compressive stress (right-hand y-ordinate) as a function of thermal treatment time (x-ordinate) for several alkali-aluminosilicate glass samples thermally treated at various times and, thereafter, ion exchanged in a 100% $KNO_3$ bath at 490° C. for 5 hours. As shown in FIG. 2, the amount of potassium incorporated into the surface of the glass during ion exchange decreases with increasing thermal treatment times. However, the surface compressive stress increases with increasing thermal treatment times. This indicates that the amount of compression imparted in the glass per atom exchanged into the glass surface increases with the thermal treatment time. This also indicates that the lattice dilation coefficient, previously believed to be constant for a given glass composition, actual varies with the thermal history of the glass.

Further, reducing the fictive temperature of the glass through the thermal treatments described herein suppresses stress relaxation in the glass and allows for ion exchange processing at higher temperatures (higher than previously possible due to significant stress relaxation that occurs in non-thermally treated glass), reducing the overall ion exchange processing time. That is, because the kinetics of the ion exchange process follow an Arrhenius relationship, increases in the ion exchange temperature exponentially increase the rate of ion exchange and, as such, decrease the amount of time required to obtain the same depth of layer. Accordingly, suppressing stress relaxation through the thermal treatments described herein allows for greater ion exchange processing temperatures which, in turn, decreases ion exchange processing time and increases process throughput, generally improving the overall efficiency of the ion exchange process.

Further, the suppression of stress relaxation by the thermal treatment methods described herein may also be beneficial in maintaining the compressive stress in glass articles that undergo additional elevated temperature treatments after ion exchange. For example, if a glass article is heat treated as part of a lamination, coating, or cleaning process after ion-exchange treatment, the suppression of stress relaxation to elevated temperatures will mitigate the loss of surface compressive stress as a result of exposure to subsequent elevated temperature processes.

Based on the foregoing, it should be understood that the thermal treatments described herein may be utilized to improve the efficiency of the ion exchange process thereby decreasing the costs associated with ion exchange processing and increasing ion exchange through-put. That is, the thermal treatments described herein increase the amount of compressive stress imparted to the glass per exchanged ion, meaning that the same amount of compressive stress and depth of layer can be achieved in fewer exchange events, thereby reducing ion exchange process time. In addition, the improvement in the compressive stress imparted to the glass per exchanged ion reduces the rate of contamination of the molten salt bath, meaning more glass articles can be processed in the bath before the molten salt in the bath is depleted and replaced, reducing process down-time. Further, the thermal treatments described herein also suppress stress relaxation in the glass, meaning higher ion exchange temperatures can be used to more rapidly obtain the same compressive stress and depth of layer, further decreasing the ion exchange process time.

The thermal treatments described herein also reduce the overall processing time for a glass article. Specifically, the thermal treatments described herein actually add time to the process of treating a glass article due to the relatively slow cooling rates used following the hold at the treatment temperature. However, the process time increase due to slow cooling is offset by the decrease in ion exchange time as a result of the properties imparted to the glass during the thermal treatment. As such, the total processing time (thermal treatment time+ion exchange time) is minimized by using the thermal treatment processes described herein. Similarly the total processing costs (thermal treatment time*thermal treatment cost/hour+ion exchange time*ion exchange cost/hour) are also minimized.

The improvement in the aforementioned characteristics of the glass article may be characterized by the pre-treatment exchange parameter $K_{50}$ and the post-treatment exchange parameter $K^*_{50}$. As noted herein, the exchange parameters refer to the time (in minutes) for a glass article to reach a 50 micron depth of layer during ion exchange in a bath of 100% $KNO_3$ at a specified temperature, either before thermal treatment or after thermal treatment. In the embodiments described herein, the post-treatment exchange parameter $K^*_{50}$ is less than the pre-treatment exchange parameter $K_{50}$. The decrease in the exchange parameter may be assessed by first determining the pre-treatment exchange parameter $K_{50}$ for a first set of glass articles in as-formed condition and comparing this value to the post-treatment exchange parameter $K^*_{50}$ for a second set of glass articles formed from the same glass composition after the second set of glass articles is treated according to the methods described herein. In the embodiments described herein, the post-treatment exchange parameter is less than the pre-treatment exchange parameter indicating that the fictive temperature of the glass has been decreased and the density of the glass has been increased.

Specifically, to assess the improvement in the ion exchange properties due to the thermal treatments described herein, a set of identical glass articles in as-formed condition and having the same glass composition are randomly divided into a first subset and a second subset, each subset having an equal number of members. The pre-treatment exchange parameter $K_{50}$ of the first subset of glass containers is determined by ion exchanging members of the first subset to determine the ion exchange time to reach a depth of layer of 50 microns for a specified ion exchange temperature (e.g., 450° C. or the like). The depth of layer and surface compressive stress are measured as described herein. The second subset of glass containers is exposed to a thermal treatment as described herein. Thereafter, the post-treatment exchange parameter $K^*_{50}$ of the first subset of glass containers is determined by ion exchanging members of the first subset to determine the ion exchange time to reach a depth of layer of 50 microns under the same conditions (i.e., ion exchange temperature) as the first subset of glass containers. The depth of layer and surface compressive stress are measured as described herein. As noted above, the post-treatment exchange parameter $K^*_{50}$ is less than the pre-treatment exchange parameter $K_50$ in the embodiments described herein, indicating that the glass containers have improved ion exchange properties, at least with respect to the time required to reach a depth of layer of 50 microns.

It has also been determined that the thermal treatments described herein improve the surface hydrolytic resistance of the glass articles. That is, the thermal treatments described herein decrease the post-treatment hydrolytic titration value of the glass articles relative to the pre-treatment hydrolytic titration value of the glass articles. The decrease in the hydrolytic titration value (corresponding to an increase in surface hydrolytic resistance) persists in the glass article following ion exchange of the glass article at ion exchange temperatures up to an IOX upper threshold temperature.

Specifically, it has been determined that the thermal treatments described herein reduce the fictive temperature of the glass prior to exposure to ion exchange processes. The reduction in the fictive temperature increases the temperature at which structural relaxation modes in the glass are activated to a temperature greater than the IOX upper threshold temperature. As a result, the improvement in the surface hydrolytic resistance of the glass is preserved through the ion exchange process provided that the ion exchange temperatures do not exceed the IOX upper threshold temperature. In some embodiments, the post-exchange hydrolytic titration value (i.e., the hydrolytic titration value after ion exchanging the glass article) is less than the pre-treatment hydrolytic titration value and the post treatment hydrolytic titration value, indicating that ion exchange process can be used to further enhance the surface hydrolytic resistance.

In the embodiments described herein, the improvement in the surface hydrolytic resistance of the glass articles decreases with increasing ion exchange temperatures up to the IOX upper threshold temperature, at which point the surface hydrolytic performance is degraded relative to that of non-ion exchanged glass articles exposed to the same thermal treatment. The ion exchange processes may be performed, for example, by ion exchanging the glass article in a molten salt bath of 100% $KNO_3$ (or a mixed salt bath of $KNO_3$ and $NaNO_3$) for a time period of less than or equal to 5 hours, or even less than or equal to 4.5 hours, at temperatures in a range from about 300° C. up to the IOX upper threshold temperature. In the embodiments described herein, the IOX upper threshold temperature may be less than or equal to about 600° C., such as less than or equal to about 575° C., or even less than or equal to about 550° C. In some embodiments, the IOX upper threshold temperature may be less than or equal to about 540° C., such as less than or equal to about 530° C., or even less than or equal to about 520° C.

While not wishing to be bound by any particular theory, it is believed that the improvement in the surface hydrolytic resistance (and chemical durability) results from the potassium-rich glass surface following ion exchange being produced via a different route than traditional glass melting and forming processes. That is, it is not the presence of the potassium in the glass surface which leads to the improvement in both the surface hydrolytic resistance, but rather how the potassium-rich glass surface is formed. The combination of the thermal treatment and the ion exchange process produces an atomic structure and chemistry which cannot be produced by melting and forming and, accordingly, will produce different properties than achievable through those routes. Thus, the improvement in both surface hydrolytic resistance and chemical durability is a result of real variation in the structure, chemistry and reactivity of the surface produced due to both the thermal history of the glass as a result of thermal treatments and the ion exchange process.

The improvement in the surface hydrolytic resistance may be characterized by determining the pre-treatment hydrolytic titration value for a first set of glass articles and comparing this value to the post-treatment hydrolytic titration value for a second set of glass articles formed from the same glass composition after the second set of glass articles is treated according to the methods described herein. In the embodiments described herein, the post-treatment hydrolytic titration value is less than the pre-treatment hydrolytic titration value indicating that the thermal treatments described herein improve the surface hydrolytic resistance of the glass containers. In some embodiments, the post-exchange hydrolytic titration value (i.e., the hydrolytic titration value after ion exchanging the glass article) is less than the pre-treatment hydrolytic titration value and the post treatment hydrolytic titration value.

Specifically, to assess the improvement in the surface hydrolytic resistance, a set of identical glass articles (i.e., glass containers) in the as-formed condition and having the same glass composition are randomly divided into a first subset and a second subset, each subset having an equal number of members. The number of containers in each of the first subset and the second subset are sufficient to produce at least one surface hydrolytic measurement according to the surface treatment test of USP <660>. For example, a 3 mL vial holds approximately 4.9 mL of liquid, so at least 11 vials are required to produce 50 mL of test fluid and at least 22 to produce 100 mL of test fluid. The pre-treatment hydrolytic titration value of the first subset of glass articles is determined according to USP <660>, as described above. When the glass articles are glass containers, the Surface Glass Test of USP <660> is used. When the glass articles are not able to contain a test solution therein, the Powdered Glass Test of USP <660> is used. In the case of glass containers, the pre-treatment hydrolytic titration value for the first subset is the average hydrolytic value of all glass articles in the first subset because the individual solutions are pooled for a single measurement according to USP <660>. The second subset of glass articles is exposed to a thermal treatment as described herein. Thereafter, the post-treatment hydrolytic titration value of the second subset of glass articles is determined by determining the hydrolytic titration value for each glass article in the subset according to USP <660>. In the case of glass containers, the post-treatment hydrolytic titration value for the second subset is the average hydrolytic value of all glass articles in the second subset because the individual solutions are pooled for a single measurement according to USP <660>. As noted above, the post-treatment hydrolytic titration value is less than the pre-treatment hydrolytic titration value, indicating that the glass articles have improved surface hydrolytic performance after thermal treatment. Similar testing protocols can be used to determine the post-exchange hydrolytic titration value after the glass article has been ion exchanged.

Based on the foregoing, it should be understood that the thermal treatments described herein may be utilized to improve the ion exchange performance and surface hydrolytic resistance of glass articles. In particular, the thermal treatments described herein may be utilized to reduced the ion exchange time necessary to achieve a specified depth of layer and surface compressive stress at a given ion exchange temperature, thereby increasing process efficiencies and decreasing expenses.

The thermal history that a glass article has been exposed to can be determined by differential scanning calorimetry (DSC) analysis of the glass article. Data derived from DSC can be used to reconstruct the thermal treatments that have been applied to the glass article.

EXAMPLES

The embodiments described herein will be further clarified by the following examples.

Example 1

To illustrate the improvement in the ion exchange properties of glass thermally treated according to the methods described herein, glass tubes formed from two different alkali aluminosilicate glass compositions (Composition A and Composition B) were thermally treated under different conditions and the pre-treatment and post-treatment exchange values were determined for different ion exchange conditions (time and temperature). Composition A included 76.8 mol. % $SiO_2$; 6 mol. % $Al_2O_3$; 11.6 mol. % $Na_2O$; 0.1 mol. % $K_2O$; 4.8 mol. % MgO; 0.5 mol. % CaO; and 0.2 mol. % $SnO_2$. Composition B included 76.3 mol. % $SiO_2$; 6.35 mol. % $Al_2O_3$; 11.67 mol. % $Na_2O$; 0.02 mol. % $K_2O$; 5.3 mol. % MgO; 0.16 mol. % CaO; and 0.2 mol. % $SnO_2$. Specifically, glass tubes with an as-drawn thermal history (high fictive temperature, low density) were used as-received to represent the as-formed condition. Other tubes of the same initial thermal history were thermally treated through a continuous motion lehr with a maximum set point near the annealing temperature of the glass. The glass experienced up to 10% of the total lehr time at the maximum temperature before undergoing a controlled cooling rate between the annealing temperature and the strain point. Once the temperature was more than 50° C. below the strain point, the samples were rapidly cooled to room temperature. Several lehr speeds were used to systematically vary the duration and extent of thermal treatment. The other boundary case was a tube sample annealed in a well-insulated box furnace. After an approximately 2 hour hold at the anneal temperature, the sample was cooled at less than −0.1 C/min between the annealing temperature and the strain point.

These tube samples subjected to various thermal treatments were then subjected to ion exchange at various temperatures and times in a molten salt bath of 100% $KNO_3$. Times were selected so as to bracket typical diffusion depths (40 µm, 50 µm, 60 µm). The stress fields were then measured using an FSM-6000LE, to determine the surface compressive stress (CS, MPa) and depth of compressive layer (DOL, µm). The results of these measurements were then averaged and modeled to interpolate results at equivalent DOL (i.e. 50 µm). The results were then the ion exchange time to achieve the equivalent DOL and the compressive stress produced for these conditions.

Figure 3A:
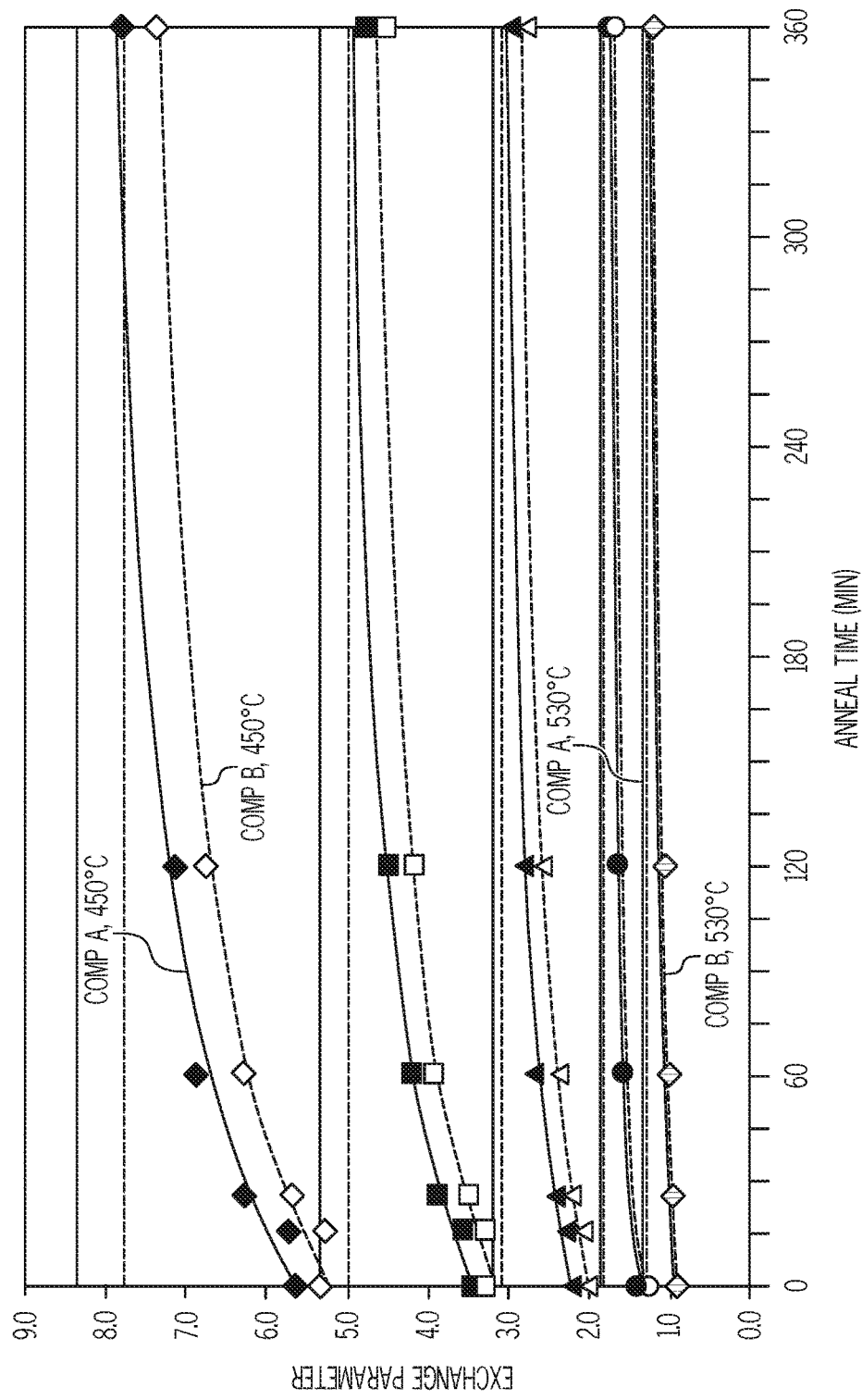
FIG. 3A graphically depicts the exchange parameter as a function of thermal treatment time for glass articles ion exchanged at different ion exchange times and temperatures.

FIG. 3A graphically depicts the variation in time to ion exchange to the specified depth as a function of thermal history (0 hrs.=not thermally treated). The data represent the interpolation to 50 µm DOL, and the CS for that set of conditions. The lines are exponential fits and are asymptotic with the dead anneal (horizontal lines). Solid lines (and filled symbols) are for Composition A and the dashed lines (and open symbols) are for Composition B. The data shows decreasing ion exchange time for increasing ion exchange temperatures from 450° C. to 530° C.

Figure 3B:
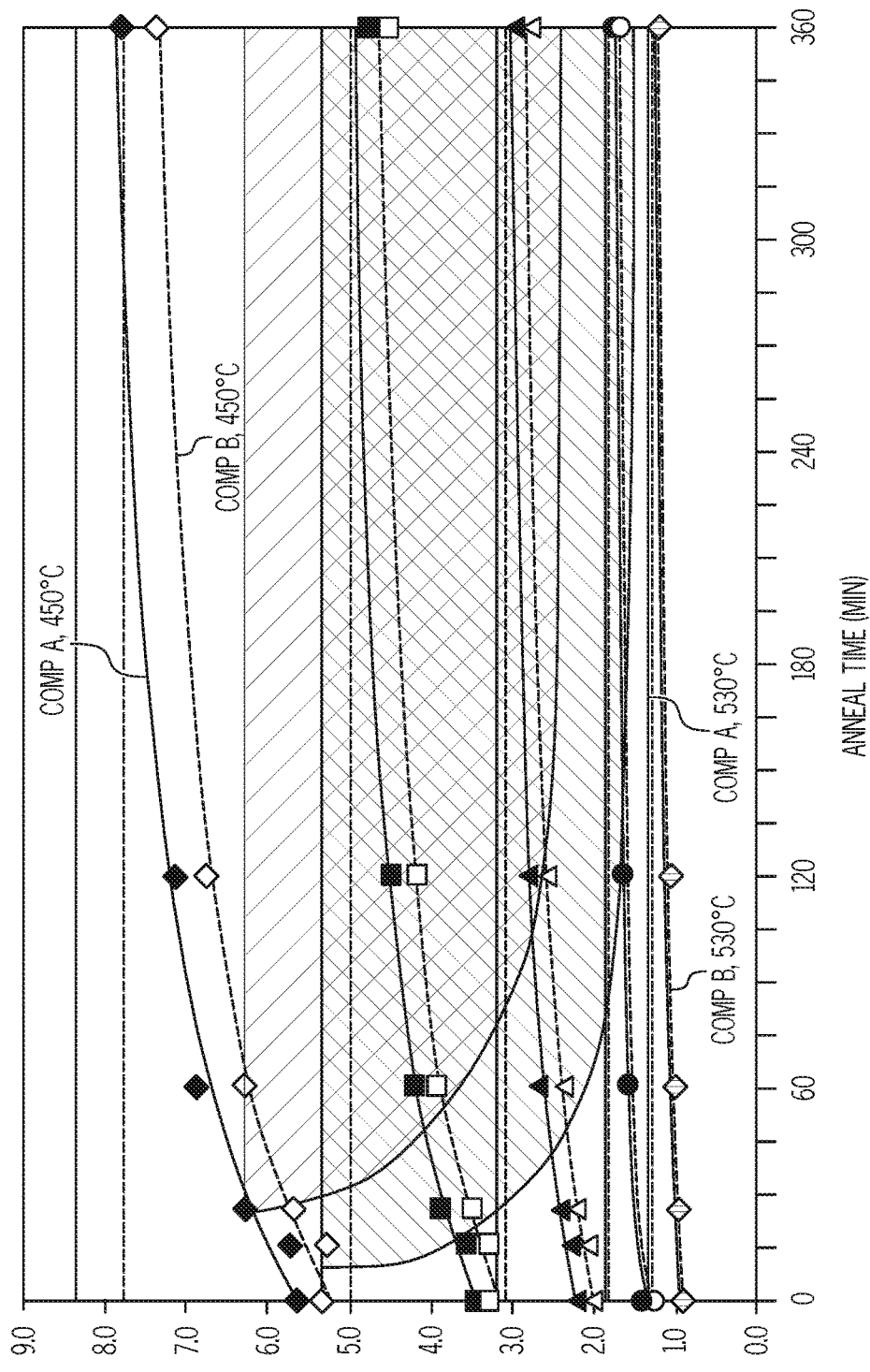
FIG. 3B graphically depicts regions of advantaged process space in which greater compressive stress or depth of layer can be achieved in equal or less ion exchange time by varying ion exchange temperature and/or thermal treatment time.

This data may be used to outline a region of equivalent or better product attributes with equivalent or reduced ion exchange time. This represents a region of process space with equivalent or reduced ion exchange costs. FIG. 3B shows regions identified as "equivalent or better" for attributes and ion exchange space relative to an arbitrary set of conditions (25 minute thermal treatment, ion exchange at 450° C. for 6.5 hours). FIG. 3B demonstrates that there is a large area of improved attributes (either higher CS or higher DOL) that can be achieved in equal or less ion exchange time by varying ion exchange temperature and thermal treatment time. The two regions show the advantaged process space for the different glass compositions.

Figure 3C:
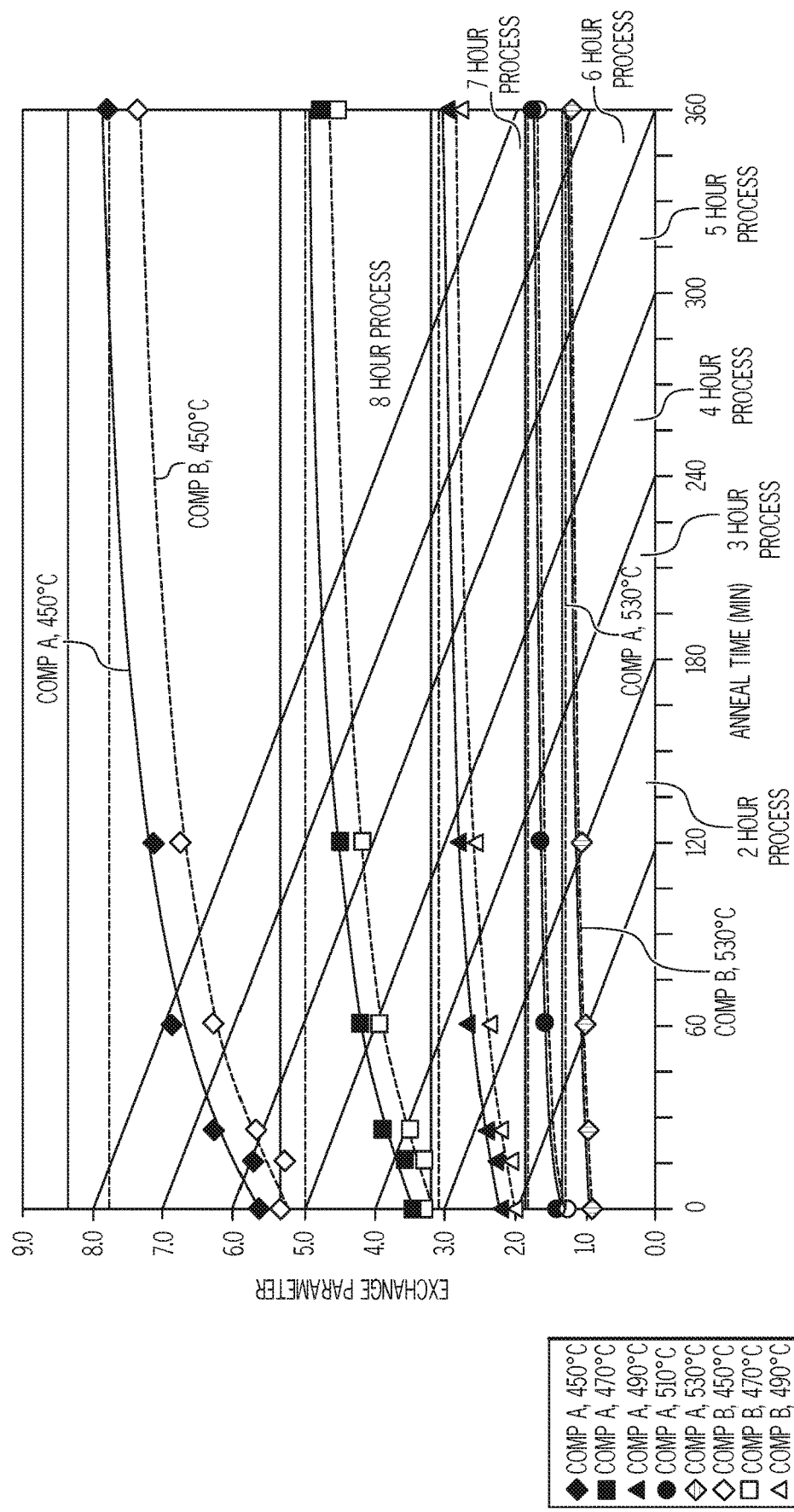
FIG. 3C graphically depicts the data of FIG. 3A identifying equivalent total process time and equivalent process costs.

Another way of interpreting the data of FIG. 3A is to consider the cost of ion exchange relative to the cost of thermal treatment. In general, the cost per hour of the ion exchange process is more expensive than the cost of the thermal treatment. However for illustration purposes, FIG. 3C shows the ion exchange process and the thermal treatment on an equal cost basis (i.e., an hour of ion exchange costs is the same as an hour of thermal treatment). In FIG. 3C, the diagonal lines represent equivalent total process time. That is, processes which lie upon a line will have an equivalent cost. If FIG. 3B and FIG. 3C are overlayed, a region of process space is identified with equivalent or advantaged process attributes and overall reduced process costs (ion exchange and thermal treatment). These lines also identify a method for minimizing the overall costs, where the inclined lines are tangent to the curvature of the regions in FIG. 3C.

Example 2

A thermal treatment profile according to the embodiments described herein generally consists of four different segments: heating ramp, hold time, initial cooling rate between the annealing temperature and the strain point, and the final cooling rate. Generally, the heating ramp rate is limited by the furnace capability and glass thickness. For thin glass articles (less than 2 mm thick), heating rates of greater than 100 K/min are common, but this heating rate does not affect the thermal history until the glass temperature is greater than $0.85*T_g$ (the glass transition temperature). The heating ramp takes articles up to $T_{anneal}+5°$ C. The hold time is the time necessary to remove stress within the glass article without deformation. For thin glass articles (less than 2 mm thick), the hold time is generally on the order of minutes. However, as the part thickness increases, so does the hold time. At the end of the hold time, any stress which had been resent should be resolved. The glass article then begins to cool from about $(T_{anneal}+5°$ C.) to about $(T_{strain}-50°$ C.) at a controlled rate. The slower the cooling rate, the lower the fictive temperature of the resultant glass article. Once the glass has been cooled sufficiently below the strain point, the rates of stress and structural relaxation are sufficiently suppressed to allow for substantially greater cooling rates to reach room temperature.

Figure 4A:
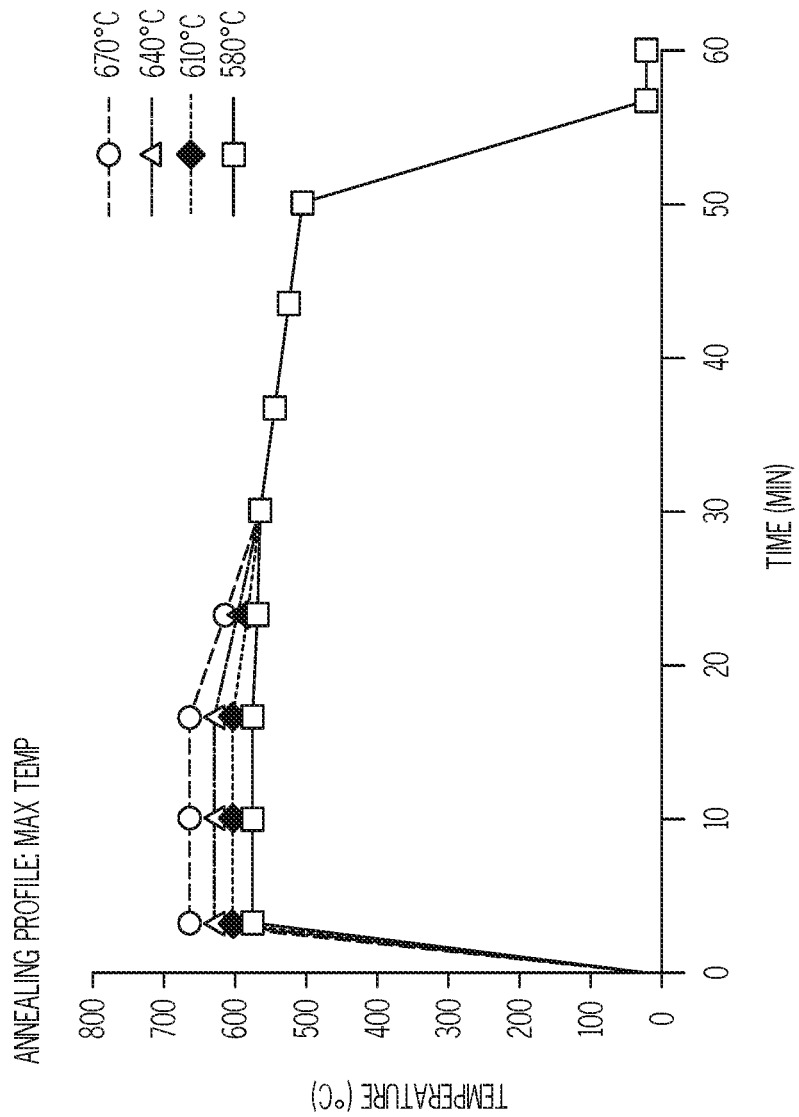
FIG. 4A graphically depicts the dependence of the thermal history of a glass article on the cooling rate from the annealing temperature through the strain point rather than on the dwell time proximate the annealing temperature.
Figure 4B:
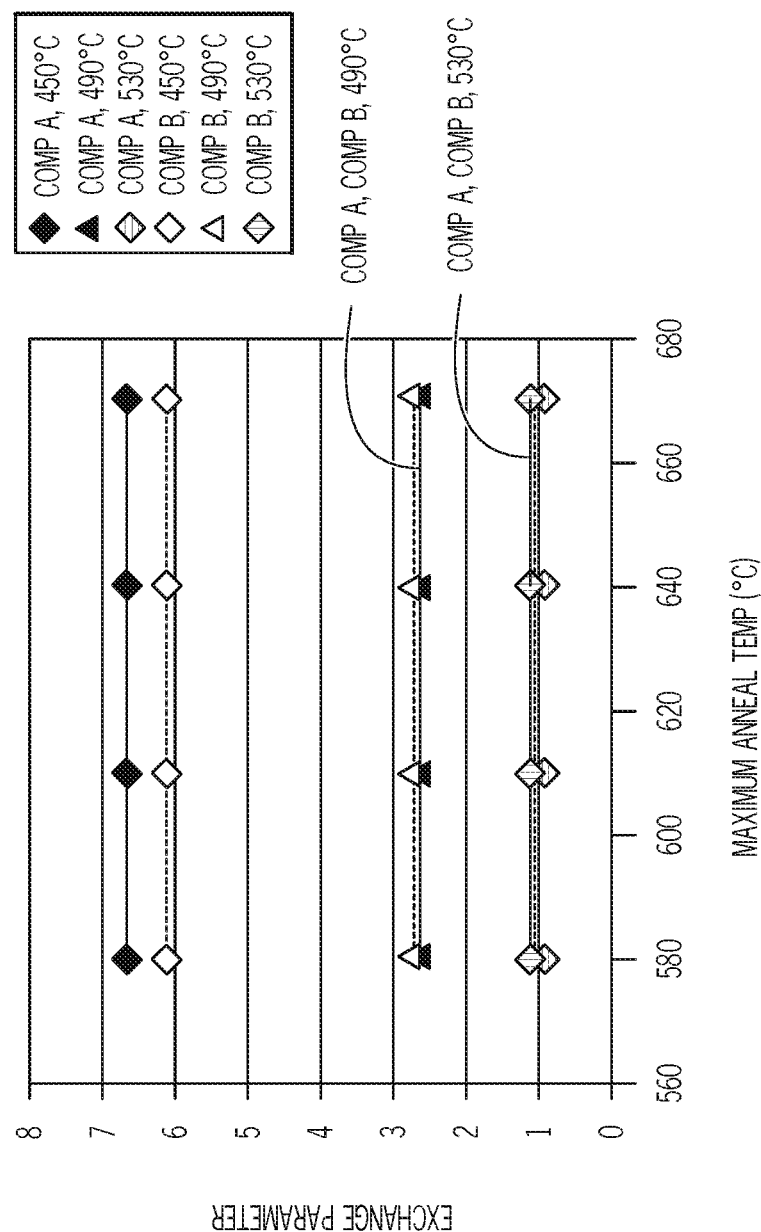
FIG. 4B graphically depicts the exchange parameter (ion exchange time to a depth of 50 μm) as a function of annealing temperature for glass articles of different compositions annealed at different temperatures.

Since the initial heating and final cooling steps do not largely influence the thermal history of the glass, it is most important to understand the relative impact of the hold time and the initial cooling rate. An experiment was designed to separate these effects by thermally treating at various treatment temperatures for a set period of time, then cooling at the same rate. FIG. 4A shows a schematic of the thermal cycles. FIG. 4B shows the exchange parameter (i.e., the exchange time to a depth of 50 μm) as a function of the maximum anneal temperature. The data in FIG. 4B indicate that, for the particular cooling rate selected (~1-5° C./min), there was no impact on the ion-exchange attributes. This shows that the thermal history is established by the cooling rate portion of the cycle, and not the hold portion of the thermal cycle.

Example 3

To assess the effect of various thermal treatments (or lack thereof) on glass articles, the pre-treatment and post-treatment hydrolytic titration values for glass containers (3 mL glass vials) formed from two different alkali aluminosilicate glass compositions (Composition A and Composition B from above) were determined for different ion-exchange states (i.e., different ion exchange times and temperatures) and different thermal treatment conditions prior to ion exchange. For purposes of comparison, pre-treatment and post treatment hydrolytic titration values for glass containers (3 mL glass vials) formed from two borosilicate glass compositions (borosilicate A and borosilicate B) were also determined.

Specifically, individual populations of 3 mL glass containers formed from two different alkali aluminosilicate glass compositions were subjected to the following heat treatments: Population 1—no thermal treatment; Population 2—BF thermal treatment (continuous lehr operating at $T_{anneal}+10°$ C. and ~20 min overall process); Population 3—120 thermal treatment (a continuous lehr operating at $T_{anneal}-15°$ C. and ~120 min overall process); and Population 4—dead anneal (a 0.25° C. cooling rate between $(T_{anneal}+5°$ C.) and $(T_{strain}-50°$ C.)). Thereafter, sub-populations of each population were ion exchanged under the following conditions: non-ion exchange; ion exchange at 450° C. for 5 hours; ion exchange at 450° C. for 11 hours; ion exchange at 490° C. for 2 hours; ion exchange at 490° C. for 5 hours; ion exchange at 530° C. for 0.75 hours; and ion exchange at 530° C. for 2 hours. Thereafter, the hydrolytic titration value for each sub-population was determined according to the Surface Glass Test of USP <660>.

Figure 5:
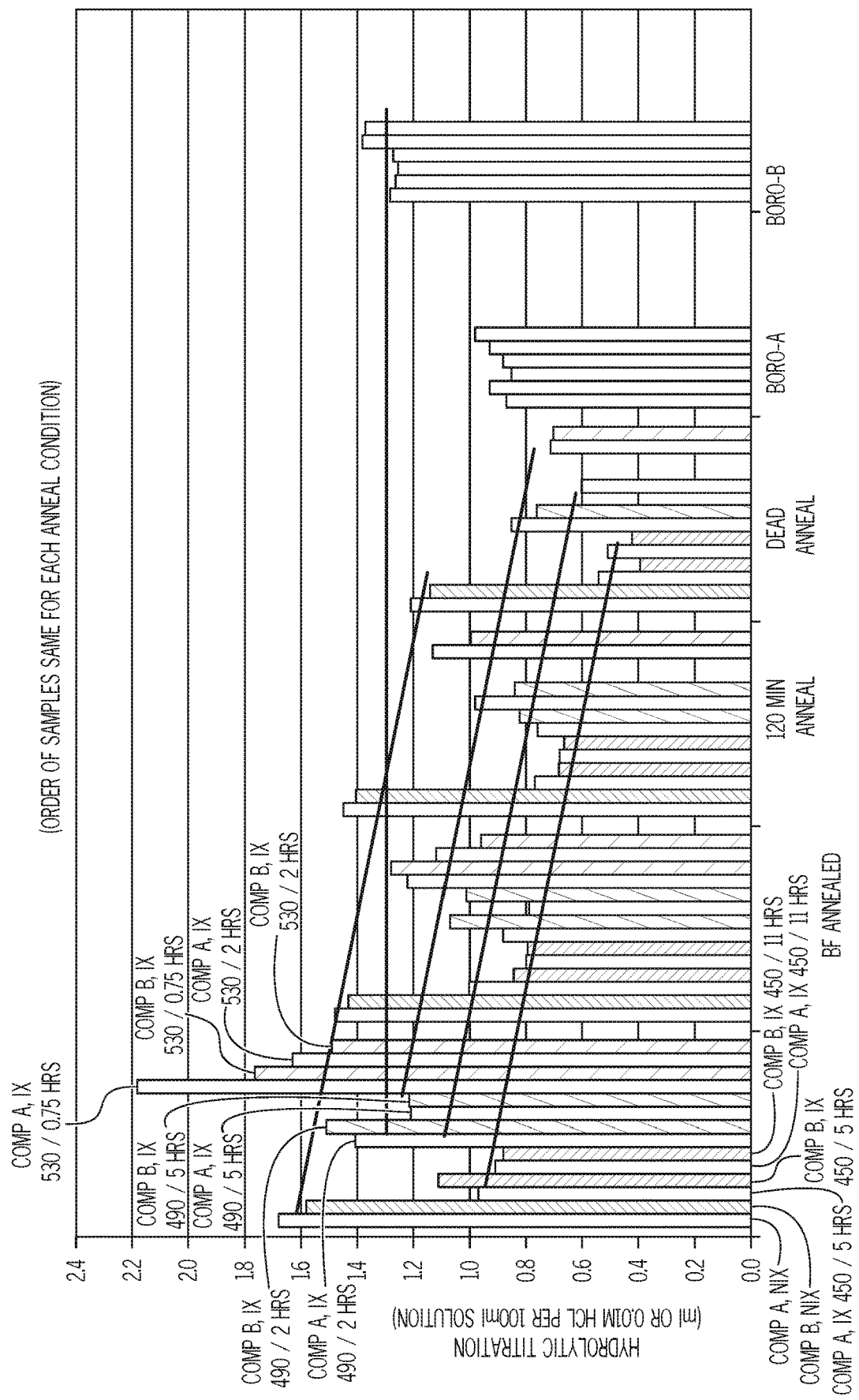
FIG. 5 graphically depicts the hydrolytic titration value as a function of thermal treatment time for a variety of ion exchange process conditions and glass compositions.

FIG. 5 shows how the surface hydrolytic resistance (as indicated by the hydrolytic titration value) varies with thermal history and the ion-exchange process conditions. The solid bars are indicative of glass containers formed from Composition A and the neighboring striped bars are indicative of glass containers formed from Composition B. FIG. 5 demonstrates that the glass containers in the as-formed condition (not thermally treated or ion exchanged) had relatively high hydrolytic titration values of ~1.6-1.7 mL and that the hydrolytic titration value decreased with increasing thermal treatment time. The data also show that the hydrolytic titration values increased with increasing ion exchange temperatures. In addition, the data shows that, for the intermediate thermal treatments, the hydrolytic treatment values increased at annealing temperatures of 530° C., indicating that the IOX upper threshold temperature for these glass compositions was approximately 530° C.

In summary, the ion-exchange of these vial populations shows various states of improvement (and degradation) in SHR performance. At the lowest ion exchange temperatures (450° C. in the data presented, but lower temperatures are also possible) the largest improvement in surface hydrolytic resistance is observed between non-ion exchanged glass containers and ion exchanged glass containers. In addition, coupling a dead-annealed thermal history with a low-temperature ion-exchange process produces the overall lowest hydrolytic titration values which correspond to the best SHR performance. Fractional improvement in SHR performance is similarly observed for the intermediate thermal treatment conditions. The data also demonstrates that the improvement in SHR performance upon ion exchange decreases with increasing ion-exchange temperature. Ion-exchange conducted at 490° C., for example, produces an improved SHR performance relative to non-ion exchanged vials of similar thermal history, but degraded SHR performance relative to lower ion exchanged temperatures. Similarly, ion-exchange conducted at 530° C. is further degraded in SHR performance relative to lower ion exchange temperatures, and for non-ion exchanged glass containers.

Example 4

To assess the chemical durability (as determined according to DIN 12116 and ISO 695), alkali aluminosilicate glass compositions were melted with different (increasing) amounts of potassium. The increase in potassium was accompanied by a corresponding decrease in the concentration of sodium. The chemical durability according to DIN 12116 and ISO 695 were then determined.

Figure 6:
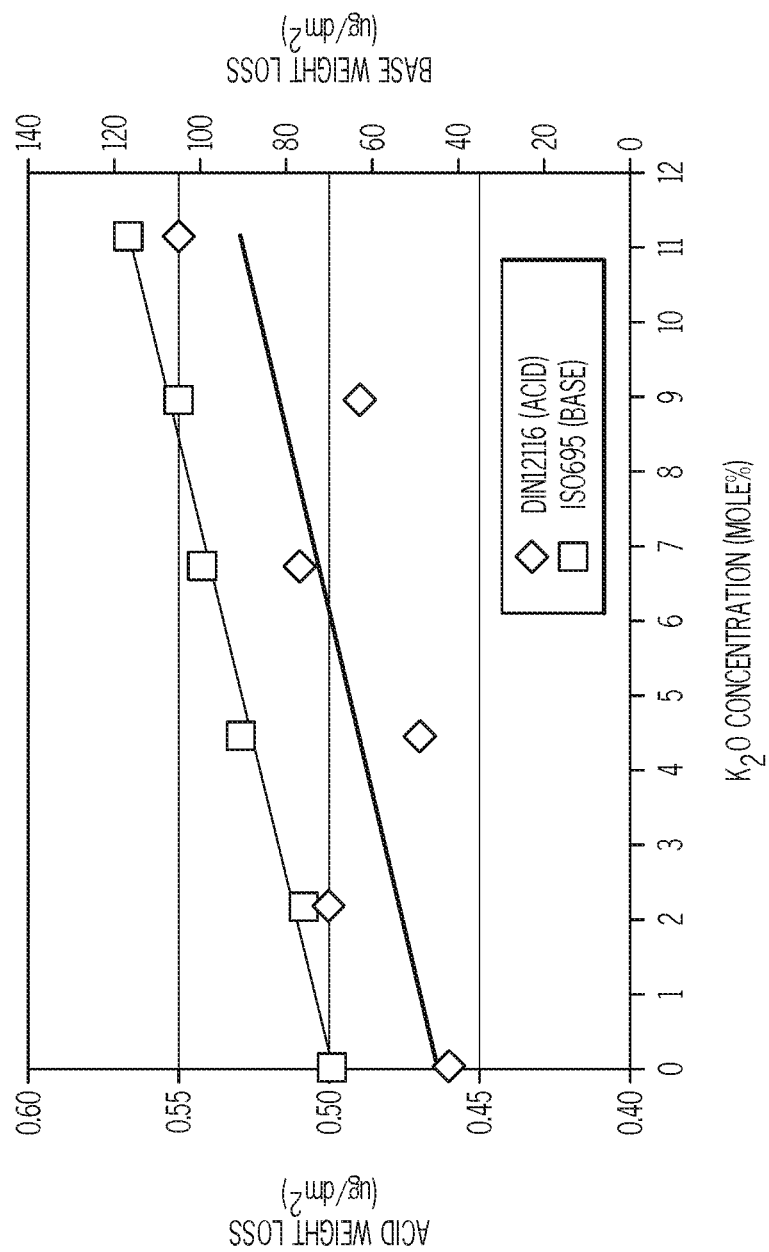
FIG. 6 graphically depicts that chemical durability of as-melted (non-ion exchanged) glasses as a function of potassium concentration in the glass melt.

FIG. 6 shows the chemical durability according to both DIN 12116 and ISO 695 as a function of as-melted glass composition without ion exchange. The data shows that durability decreases (i.e., higher weight loss values) with increasing potassium content. This shows that the change in chemistry upon ion exchange, by itself, is not responsible for the improvement in chemical durability observed between non-ion exchanged and ion exchanged glass articles. In fact, the data suggests that post ion exchange chemical durability should be worse than pre-ion exchange due to the reduced durability of the potassium-containing glass.

Example 5

To assess the effect of cooling rate on structural relaxation, two samples of the same alkali aluminosilicate glass composition (Composition A from above) were heated at the same heating rate and then cooled through the strain point at different rates. The samples were then analyzed by differential scanning calorimetry (DSC).

Figure 7:
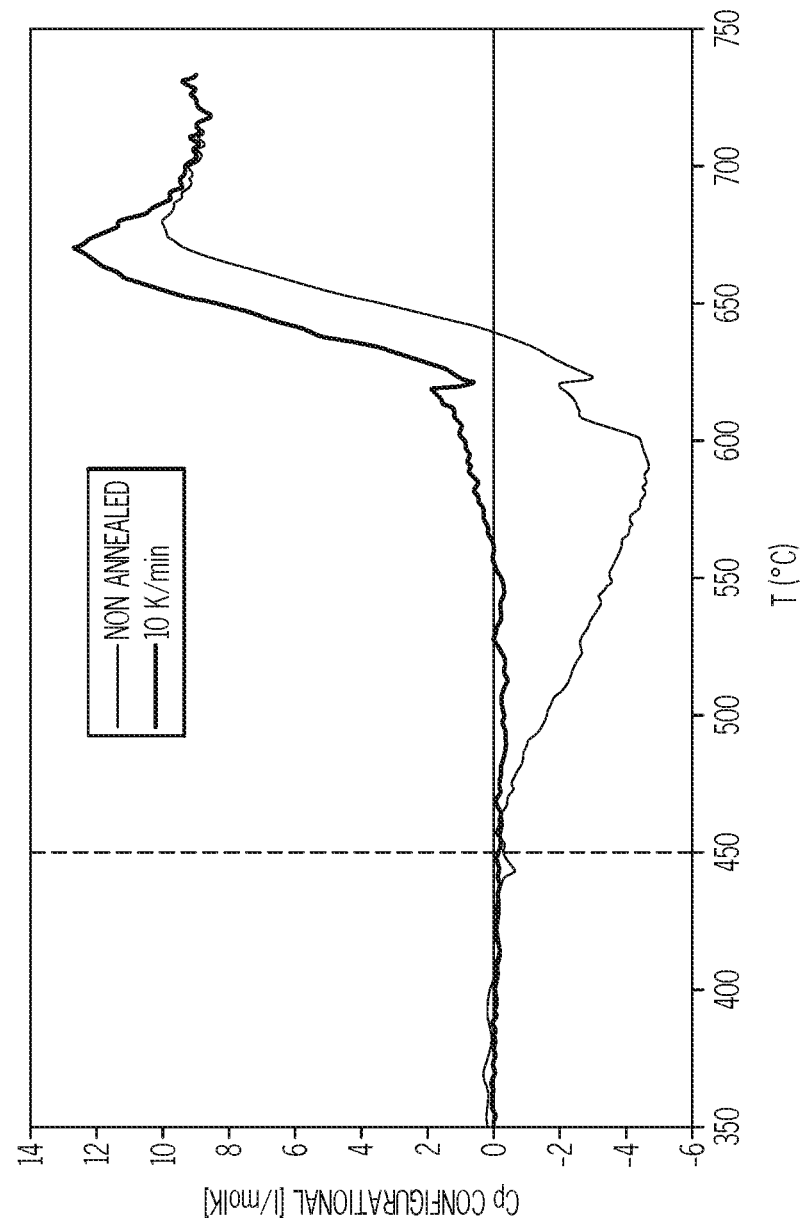
FIG. 7 graphically depicts differential scanning calorimetry data for glass samples with the same heating rate and different cooling rates.

FIG. 7 shows DSC heating scans for the two samples analyzed at the same heating rate (10K/min). The results show that, despite having a strain point in excess of 550° C. and an anneal point exceeding 615° C., substantial relaxation modes exist in non-thermally treated samples at much lower temperatures. The data also shows that some of these modes extend to temperatures near the ion-exchange temperature (450° C.). This means that for non-thermally treated samples ion exchanged at these temperatures (greater than 450° C.), there is substantial structural relaxation that occurs during the ion exchange process which would, as a result, change the properties of the glass relative to the thermally treated glass article. That is, the glass article would not retain the same compressive stress upon ion exchange due to the structural relaxation which occurs at the ion exchange temperature.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A method for thermally treating glass articles, the method comprising:
heating a glass article to a treatment temperature equal to an annealing temperature of the glass article ±15° C. at a first heating rate $HR_1$, the glass article having a pre-treatment hydrolytic titration value prior to thermally treating;
holding the glass article at the treatment temperature for a holding time greater than or equal to 5 minutes;
cooling the glass article from the treatment temperature through a strain point of the glass article at a first cooling rate $CR_1$ less than 0° C./min and greater than −20° C./min such that a density of the glass article is greater than or equal to 0.003 g/cc after cooling, wherein $|HR_1|>|CR_1|$; and
cooling the glass article from below the strain point at a second cooling rate $CR_2$, wherein $|cR_2>|CR_1|$, the glass article having a post-treatment hydrolytic titration value after thermally treating, wherein the pre-treatment hydrolytic titration value is greater than the post-treatment hydrolytic titration value.

2. The method of claim 1, wherein the first cooling rate $CR_1$ is from about −1° C./min to about −10° C./min.

3. The method of claim 1, wherein the holding time is less than or equal to 15 minutes.

4. The method of claim 1, wherein the treatment temperature is within a range from the annealing temperature to 10° C. greater than the annealing temperature.

5. The method of claim 1, wherein the glass article is cooled at the second cooling rate $CR_2$ to room temperature.

6. The method of claim 1, wherein the glass article is cooled at the first cooling rate $CR_1$ from about 0.3 hours to about 3 hours.

7. The method of claim 1, wherein the glass article is cooled at the first cooling rate $CR_1$ from about 0.5 hours to about 1 hour.

8. The method of claim 1, wherein:
the glass article has a pre-treatment exchange parameter $K_{50}$ prior to thermally treating; and
a post-treatment exchange parameter $K_{*50}$ after thermally treating, wherein $K_{50}$ is greater than $K_{*50}$.

9. The method of claim 1 further comprising ion exchanging the glass article in a molten salt bath comprising $KNO_3$ after cooling at the second cooling rate $CR_2$.

10. The method of claim 9, wherein the glass article is ion exchanged at a temperature less than or equal to about 530° C.

11. The method of claim 9, wherein:
the glass article has a pre-treatment hydrolytic titration value prior to thermally treating;
a post-treatment hydrolytic titration value after thermally treating; and
a post-exchange hydrolytic titration value after ion exchanging, wherein the pre-treatment hydrolytic titration value is greater than the post-treatment hydrolytic titration value and the post-treatment hydrolytic titration value is greater than the post-exchange hydrolytic titration value.

12. A method for thermally treating glass articles, the method comprising:
heating a glass article to a treatment temperature equal to an annealing temperature of the glass article ±15° C. at a first heating rate $HR_1$;

holding the glass article at the treatment temperature for a holding time greater than or equal to 5 minutes and less than or equal to 15 minutes, the glass article having a pre-treatment exchange parameter $K_{50}$ prior to thermally treating;

cooling the glass article from the treatment temperature through a strain point of the glass article at a first cooling rate $CR_1$ less than 0° C./min and greater than −20° C./min, wherein $|HR_1|>|CR_1|$; and cooling the glass article from below the strain point at a second cooling rate $CR_2$, wherein $|CR_2|>|CR_1|$, the glass article having a post-treatment exchange parameter $K_{*50}$ after thermally treating, wherein $K_{50}$ is greater than $K_{*50}$.

13. The method of claim 12, wherein the first cooling rate $CR_1$ is from about −1° C./min to about −10° C./min.

14. The method of claim 12, wherein the treatment temperature is within a range from the annealing temperature to 10° C. greater than the annealing temperature.

15. The method of claim 12, wherein:

the glass article has a pre-treatment hydrolytic titration value prior to thermally treating; and a post-treatment hydrolytic titration value after thermally treating, wherein the pre-treatment hydrolytic titration value is greater than the post-treatment hydrolytic titration value.

16. The method of claim 12 further comprising ion exchanging the glass article in a molten salt bath comprising $KNO_3$ after cooling at the second cooling rate $CR_2$.

17. The method of claim 16, wherein the glass article is ion exchanged at a temperature less than or equal to about 530° C.

18. The method of claim 16, wherein:

the glass article has a pre-treatment hydrolytic titration value prior to thermally treating;

a post-treatment hydrolytic titration value after thermally treating; and a post-exchange hydrolytic titration value after ion exchanging, wherein the pre-treatment hydrolytic titration value is greater than the post-treatment hydrolytic titration value and the post-treatment hydrolytic titration value is greater than the post-exchange hydrolytic titration value.

* * * * *

UNITED STATES PATENT AND TRADEMARK OFFICE
CERTIFICATE OF CORRECTION

Page 1 of 1

PATENT NO.         : 10,710,920 B2
APPLICATION NO.    : 15/541240
DATED              : July 14, 2020
INVENTOR(S)        : Adam James Ellison et al.

It is certified that error appears in the above-identified patent and that said Letters Patent is hereby corrected as shown below:

On the Title Page

In Column 2, item (56), Other Publications, Line 4, delete ".htnnl>." and insert -- .html>. --, therefor.

In Column 2, item (57), Abstract, Line 7, delete "CR1" and insert -- $CR_1$ --, therefor.

On page 2, in Column 2, item (56), Other Publications, Line 17, delete "1 2017125444." and insert -- 2017125444. --, therefor.

In the Claims

In Column 16, Line 21, Claim 1, delete "|cR₂>|" and insert -- $|CR_2|>$ --, therefor.

In Column 17, Line 11 (approx.), Claim 12, delete "|CR₂>|" and insert -- $|CR_2|>$ --, therefor.

Signed and Sealed this
Thirteenth Day of October, 2020

Andrei Iancu
*Director of the United States Patent and Trademark Office*